Aug. 13, 1963     R. H. F. STRESAU     3,100,349
BORE MEASURING DEVICE
Filed Feb. 23, 1961
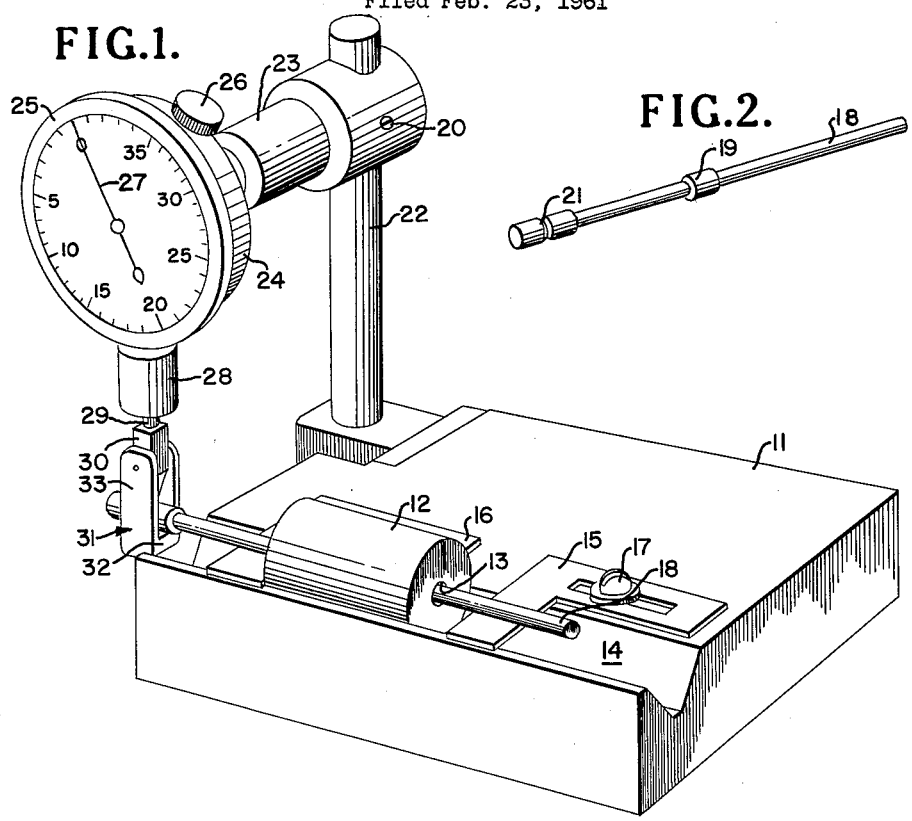
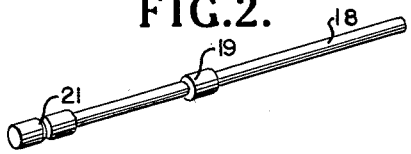
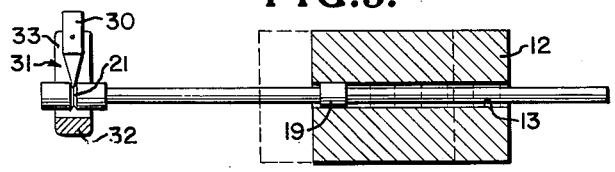
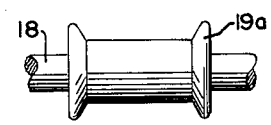
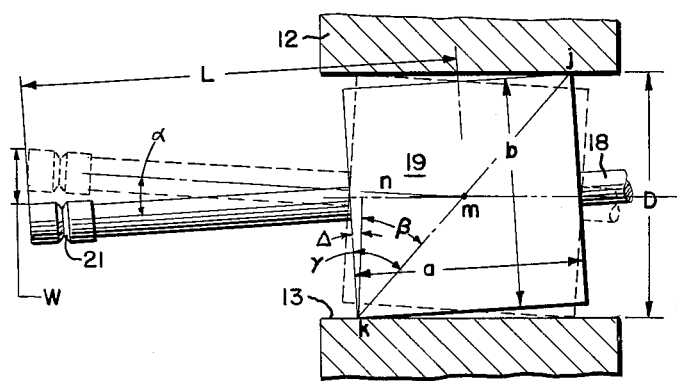
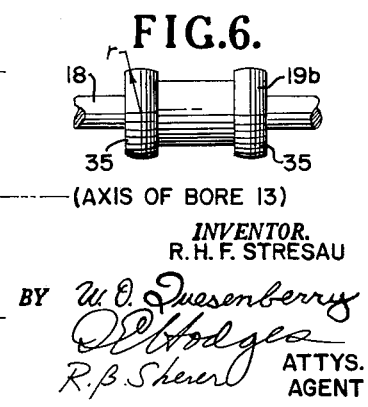
INVENTOR.
R. H. F. STRESAU United States Patent Office 3,100,349
Patented Aug. 13, 1963

3,100,349
BORE MEASURING DEVICE
Richard H. F. Stresau, Lake Zurich, Ill., assignor to the United States of America as represented by the Secretary of the Navy
Filed Feb. 23, 1961, Ser. No. 91,287
9 Claims. (Cl. 33—178)
(Granted under Title 35, U.S. Code (1952), sec. 266)

The invention described herein may be manufactured and used by or for the Government of the United States of America for governmental purposes without the payment of any royalties thereon or therefor.

This invention relates to precision measuring instruments and, in particular, to a device for measuring the diameter of a bore in an object. In the field of precision measurements, it has been the general practice to employ such devices as internal calipers, feeler gages, or plug gages and, although such devices have served the purpose, they have not proved entirely satisfactory, particularly since they depend upon the skill or manipulation of the operator which is subject to wide variation. Other instruments of greater precision are known in the art, however, such devices are expensive and require extensive periods of time to adjust and calibrate.

In cases where only a small number of high precision measurements are to be made, the aforementioned disadvantages may be tolerable if not desirable, however, where a great number of such measurements are to be made, as for example, in quality control procedures wherein hundreds of measurements must be made daily, the problems of time consumption and cost become critical. Those concerned with the use of such devices to measure the internal diameter of bores have long recognized the need for a simple, quick operating and inexpensive device which will measure the bore with a high degree of accuracy.

The general purpose of this invention is to provide a bore measuring instrument which embraces all of the advantages of similarly employed devices and possesses none of the aforedescribed disadvantages. Whereas, the prior art devices relied upon the use of a member which was inserted into the bore and whose size was then adjusted therein, the instant device utilizes an elongated rod member having an enlarged portion of known and fixed diameter and length which is inserted into the bore and which is wobbled or rocked therein. The amount of rocking or wobbling motion is automatically measured and this value is substituted in an equation to thereby give the precise diameter of the bore.

An object of the present invention is the provision of a new and improved bore measuring instrument which is inexpensive and easy to use.

Another object is to provide a precision measuring instrument which is extremely accurate and which can be used in either open or closed end bores.

A further object of the invention is the provision of an internal diameter measuring device which can be easily adjusted to measure the diameters of bores in objects of various sizes.

A still further object of the invention is to provide a bore measuring instrument which can also be used as an oversized-undersized indicator.

Other objects and advantages of the invention will hereinafter become more clearly apparent from the following description and drawings, which illustrate a preferred embodiment, and wherein:

FIG. 1 is a perspective view of the instrument in its operating position;

FIG. 2 is a perspective view of the rod removed from the bore;

FIG. 3 is a side view partly in cross section of the rod and the cylinder containing the bore to be measured showing the adjustable positions of the cylinder;

FIG. 4 is an enlarged cross-sectional view of the left hand portion of FIG. 3 showing the various distances utilized in computing the diameter of the bore;

FIG. 5 is a plan view of an alternative form showing the enlarged portion of the rod as being spool shaped; and FIG. 6 is a plan view of an alternative form forming the enlarged portion of the rod as being dumbbell shaped.

Referring first to FIG. 1, numeral 11 designates a base plate having a trough 14 in its upper surface wherein the object 12 containing bore 13 may be slidably positioned. Two stop members 15—16 are adjustably secured to base plate 11 by means of screws 17 and washers, only one set of which is visible in FIG. 1.

As shown in FIGS. 1 and 3, rod 18 carries an enlarged portion 19 and has a groove 21 provided in the extreme left hand portion thereof. As shown in FIG. 4, the diameter $b$ of the enlarged portion 19 and the length $a$ of said portion are known and fixed. Similarly, the distance L from one end of rod 18 to the mid section of enlarged portion 19 is also known and fixed. Since diameter $b$ is slightly less than the bore diameter D, rod member 18 is subject to rocking or wobbling movement within the bore and the linear distance of travel of the left hand end of rod 18 is represented by W in FIG. 4.

Referring now to the geometrical relationships shown in FIG. 4, $m$ designates the centroid of enlarged portion 19 about which the rocking or wobbling movement occurs. In practice, point $m$ will execute a slight piston-like motion along the axis of bore 13, however, since this motion does not affect the formula, point $m$ will be considered as fixed in deriving the formula and the sole motion under consideration will be the rotational movement about said fixed point $m$.

In order to derive the formula, a construction line $k$—$n$ is drawn perpendicular to the axis of bore 13 and a diagonal line is drawn from point $k$ to point $j$. Since $m$—$n$ is perpendicular to $n$—$k$, $\alpha$ is equal to $\Delta$ and since $\gamma = \beta + \Delta$, $\gamma$ will equal $\beta + \alpha$. Therefore $\beta = \gamma - \alpha$. From a consideration of triangle $m$—$n$—$k$, it is apparent that

[1] $$\cos \beta = \frac{D}{2} \Big/ \frac{\sqrt{b^2 + a^2}}{2}$$

[2] Therefore: $D = \sqrt{b^2 + a^2} \cos \beta$

[3] But since, as previously stated, $\beta = \gamma - \alpha$, the $\cos \beta$ also equals $\cos \gamma \cos \alpha + \sin \gamma \sin \alpha$, and

[4] $$\cos \gamma = \frac{b}{\sqrt{b^2 + a^2}}$$

[5] $$\cos \alpha = [\sqrt{[L^2 - W^2]/4}]/L$$

[6] $$\sin \gamma = \frac{a}{\sqrt{b^2 + a^2}}$$

[7] $$\sin \alpha = \frac{W}{2L}$$

Therefore, substituting Expressions 4–7 for $\cos \beta$ in Equation 2, it is found that:

[8] $$D = \sqrt{b^2 + a^2} \left( \frac{b\sqrt{[L^2 - W^2]/4}}{[\sqrt{b^2 + a^2}]L} + \frac{aW}{2L\sqrt{b^2 + a^2}} \right)$$

[9] which reduces to
$$b\left(-\frac{W^2}{4L^2}\right)^{1/2} + \frac{aW}{2L}$$

[10] of which the first approximation is
$$b + \frac{aW}{2L}$$

Of course, where the highest degree of precision is required, the expression $$D = b\left(\frac{1-W^2}{4L^2}\right)^{1/2} + \frac{aW}{2L}$$

may be used to calculate the diameter.

Referring now to FIG. 1, numeral 22 designates a support member upon which is slidably mounted carrier member 23 which may be adjusted at any particular height by means of set screw 20. Numeral 24 designates a dial indicator which is rigidly secured to carrier member 23. Dial indicator 24 carries a movable scale 25 the setting of which may be adjusted relative to pointer 27 and which may be locked in any desired setting by means of locking screw 26. Pointer 27 is connected to shaft 29 by suitable reduction means such that the linear travel of shaft 29 is indicated by pointer 27 relative to scale 25. Shaft 29 is guided by guide member 28 and has a knife edge 30 rigidly secured thereto.

As best shown in FIG. 3, knife edge 30 is adapted to engage groove 21 whereby the wobbling movement of rod 18 is transmitted through knife edge 30 and shaft 29 to pointer 27.

As shown in FIGS. 1 and 3, a saddle member 31 is connected to knife edge 30, however, neither base portion 32 nor sides 33 engage the end of rod 18. Saddle member 31 serves merely to prevent rod 18 from slipping out from under knife edge 30 during manipulation of the instrument.

The operation of the device will now be described.

An object such as cylinder 12 containing a bore 13 is placed in trough 14 and stop members 15 and 16 are adjusted so as to limit the extent of travel of object 12. In a preferred method of using the instant device, stop members 15 and 16 are adjusted so that cylinder 12 may be moved from a position wherein enlarged member 19 of rod 18 is near the left hand end of bore 13 to a position wherein the right hand end of bore 13 is adjacent enlarged portion 19 as viewed in FIG. 3. In this manner, readings may be taken at each end of the bore with a minimum amount of adjustment. Once stop members 15 and 16 are adjusted, rod 18 is inserted into bore 13 and carrier member 23 is adjusted so that knife edge 30 is just below the vertical position of the upper surface of groove 21. The right hand end of cylinder 12 is lifted a sufficient amount so that groove 21 of rod 18 may be slid under and engage knife edge 30. The operator then depresses the right hand end of cylinder 12 so that the cylinder is returned to a horizontal position. By means of this procedure, groove 21 is securely engaged by knife edge 30, and knife edge 30 and shaft 29 are moved upward against the force of a spring [not shown] which is disposed inside the dial indicator. Rod 18 and enlarged portion 19 now are in the solid line position as shown in FIG. 4. Set screw 26 is loosened and dial indicator scale 25 is adjusted to a zero reading whereupon set screw 26 is tightened. If bore 13 is of the open type so that the right hand portion of rod 18 extends outwardly therefrom, the operator may depress the right hand portion of rod 18 in order to deflect the rod through its limited amount of travel, which amount is registered by pointer 27. Having noted the deflected position of pointer 27, the operator may then slide cylinder 12 to the right until it abuts against stop member 15, whereupon the deflection procedure may be repeated. In addition, if it is desired, cylinder 12 may be rotated to a new position and the deflection procedure repeated any number of times. When a sufficient number of readings have been taken to satisfy the requirements of the desired degree of precision the values of the deflection W may be substituted into the formula $$D = b + \frac{aW}{2L}$$

and the magnitude of the diameter may be found. Obviously, the formula may be plotted or incorporated into a calculator so that direct reading of corresponding diameter values may be made for each deflection value W which is obtained, thereby eliminating any need for actual calculation.

Although the instant device does not require any particular material, it should be noted that it is desirable to employ a material for enlarged portion 19 which is wear resistant and which is of sufficient hardness so that it will not be deformed upon rocking movement of rod 18. Similarly, it should be noted that the material of rod 18 must not be flexible, otherwise inaccurate readings will obviously occur.

In the case where object 12 has a blind or closed bore, the right hand portion of rod 18 may obviously be removed and the manipulation is done by lifting the left hand portion of rod 18.

In the preferred design shown in FIGS. 1 through 4, enlarged portion 19 is shown to be cylindrical which is the most economical shape to produce, however, for certain applications, particularly where the bore is irregular, a design such as shown in FIGS. 5 or 6 may be advantageously employed. The spool shaped design shown in FIG. 5 has been found to be advantageous where the internal surface of the bore is irregular and the dumbbell shaped design shown in FIG. 6 has been found to be advantageous where the bore is located in an abrasive object since it is subject to less wear than the forms shown in FIGS. 4 and 5 wherein relatively sharper and more wearable corners are presented to the internal surface of the bore. In addition such wear is more easily detected since it is easier to apply micrometers across enlarged end portions 35 than across the edge of the cylinder or spool, and finally, the dumbbell shape is found to be further advantageous in that the formula $$D = b + \frac{aW}{2L}$$

is exact rather than approximate where the radius of curvature $r$ is used in place of line $m-n$.

It should be understood, of course, that the foregoing disclosure relates to only a preferred embodiment of the invention and that numerous modifications or alterations may be made therein without departing from the scope and spirit of the invention as set forth in the appended claims.

Having thus described the invention, what is claimed is:

1. A precision instrument for use in determining the diameter of a bore in an object comprising; an elongated rod member having an enlarged portion of known diameter and length inserted in the bore and having an end portion extending beyond one end of the bore, said end portion having a groove formed therein at a known distance from the center of said enlarged portion, movement measuring means having a knife edge adapted to seat at a selected point within said groove, and means to retain said knife edge within said groove, whereby, upon rocking movement of said enlarged portion within the bore, the amount of deflection of said selected point in the plane of the movement is measured thereby indiciating the bore diameter.

2. A precision instrument for use in determining the diameter of a bore in an object comprising; adjustable means for positioning the object, an elongated rod member having an enlarged portion of known diameter and length inserted in the bore and having an end portion extending beyond one end of the bore, said end portion having a groove formed therein at a known distance from the center of said enlarged portion, movement measuring means having a knife edge adapted to seat within said groove at a selected point, whereby, upon rocking movement of said enlarged portion within the bore, the amount of deflection of said selected point in the plane of the movement is measured thereby indicating the bore diameter.

3. The precision instrument as claimed in claim 2 wherein said movement measuring means further comprises a dial type indicator.

4. A precision instrument as claimed in claim 3 wherein said movement measuring means is adjustable relative to the position of the rod.

5. The precision instrument as claimed in claim 2 wherein the enlarged portion of the rod is cylindrical in shape.

6. The precision instrument as claimed in claim 2 wherein the enlarged portion of the rod is spool shaped.

7. The precision instrument as claimed in claim 2 wherein the enlarged portion of the rod is formed in the shape of a dumbbell.

8. A precision instrument as claimed in claim 2 wherein the rod extends outwardly from said object in both directions, whereby, the deflection may be made by depressing that portion of the rod which extends outwardly from the object on the side opposite to the side adjacent which the movement measuring means is located.

9. An indicating device for use in determining whether or not the diameter of a bore in an object is within the maximum and minimum permissible values which comprises; an elongated rod member having an enlarged portion of known diameter and length inserted in the bore and having an end portion extending beyond one end of the bore, said end portion having a groove formed therein at a known distance from the center of said enlarged portion, movement indicating means having a knife edge adapted to seat within said groove at a selected point and means to retain said knife edge within said groove, whereby, upon rocking movement of said enlarged portion within the bore, the amount of linear movement of said selected point is indicated by the indicating means thereby indicating whether or not the diameter of the bore is within the permissible maximum and minimum values.

References Cited in the file of this patent

UNITED STATES PATENTS

| | | |
|---|---|---|
| 1,048,073 | Hirth | Dec. 24, 1912 |
| 1,196,981 | Riebe | Sept. 5, 1916 |

FOREIGN PATENTS

| | | |
|---|---|---|
| 291,286 | Great Britain | May 31, 1928 |
| 74,415 | Sweden | May 31, 1932 |